Sept. 6, 1966 A. SIMON 3,271,684

METHOD OF AUTOMATICALLY ADJUSTING A BROADCAST TRANSMITTER

Filed Aug. 6, 1962 2 Sheets-Sheet 1

Sept. 6, 1966 A. SIMON 3,271,684

METHOD OF AUTOMATICALLY ADJUSTING A BROADCAST TRANSMITTER

Filed Aug. 6, 1962 2 Sheets-Sheet 2

United States Patent Office 3,271,684
Patented Sept. 6, 1966

3,271,684

METHOD OF AUTOMATICALLY ADJUSTING A BROADCAST TRANSMITTER

Adolf Simon, Berlin-Steglitz, Germany, assignor to Siemens & Halske Aktiengesellschaft Berlin and Munich, a corporation of Germany Filed Aug. 6, 1962, Ser. No. 215,062
Claims priority, application Germany, Aug. 30, 1961, S 75,507
12 Claims. (Cl. 325—175)

The invention disclosed herein is concerned with an arrangement for automatically adjusting a broadcast transmitter.

The broadcasting art poses the problem of remotely controlling one or more transmitters from a central control station. Inasmuch as all oscillation circuits of the transmitter must be retuned when a change in wave length is to be effected, also usually calling for alteration of the coupling adjustments and amplification adjustments, the remote control of all involved adjustment elements entails a very great expenditure. A great simplification is therefore achieved by merely conducting to the transmitter, from the central control station or the like, a control frequency to which the transmitter adjusts itself automatically. The automatic frequency adjustment of individual tuning circuits is as such known in connection with broadcast transmitters and receivers. However, it does not solve the problem of automatically adjusting all elements of a large complicated transmitter to the control frequency supplied from a central control station.

The arrangement provided by the invention, for solving the problem of automatically adjusting a broadcast transmitter to a control frequency conducted thereto from a central control station or the like, comprises, means for the frequency determination of the supplied control frequency so as to effect automatically a coarse adjustment of the tuning elements of the transmitter stages, means for resonance tuning whereby the oscillation circuits in the transmitter stages are automatically finely adjusted to the control frequency, means for adjusting the coupling so as to automatically adjust the decoupling of power of the transmitter stage by impedance matching to the working impedance, and means for adjusting the amplification whereby the total amplification of the transmitter is automatically adjusted to the desired output power.

The individual adjustments are not independent of one another, and it is therefore of advantage that such adjustments are, incident to each required readjustment, continuously effected in given predetermined sequence. A program control is for this purpose advantageously used for effecting the individual adjustments in the desired sequence.

The invention and further details thereof will now be described with reference to the accompanying drawings showing a circuit for a high-power broadcast transmitter provided with means for effecting automatic tuning thereof to a frequency supplied from a central control station.

Figure 1A:
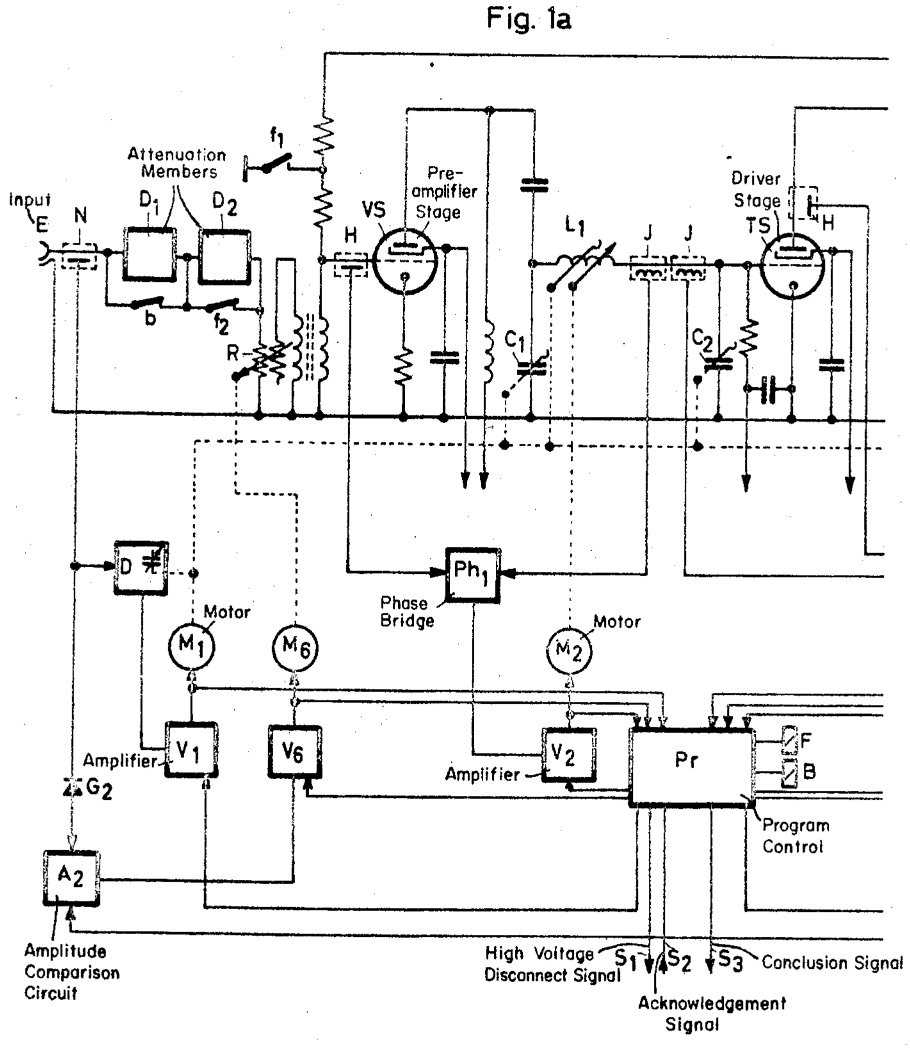
Figure 1B:
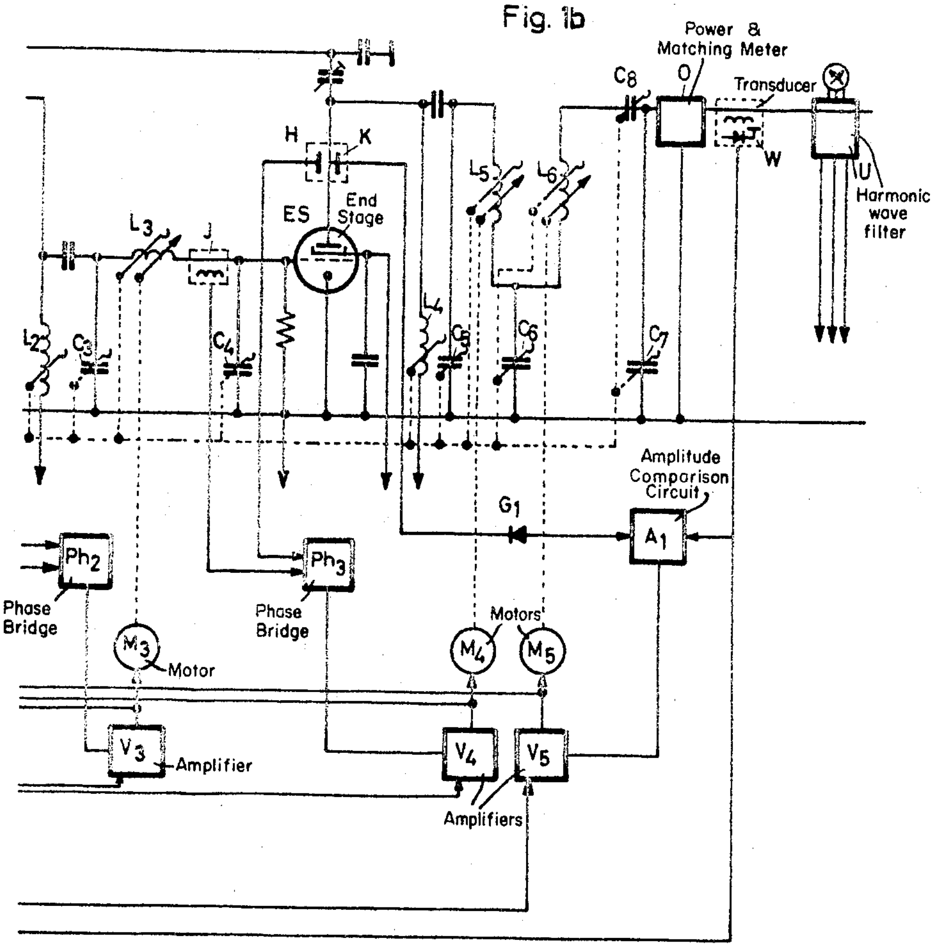

For the reading of the circuit, FIG. 1*a* should be placed to the left of FIG. 1*b*, with corresponding lines in proper horizontal alignment.

The transmitter comprises a preamplifier stage VS, a driver stage TS and an end stage ES. The control frequency from the central control station is supplied to the input E. A program control device P*r* is provided for effecting the release of the individual adjustment operations. An RC- discriminator D with a rotary capacitor is employed for the determination of the supplied frequency. In the discriminator, the voltages on the rotary capacitor and a fixed resistor, both of which are traversed by the same current with the supplied frequency, are rectified and connected in opposition. In case the two voltages are different, there will result a direct voltage the polarity of which depends upon whether the supplied frequency is higher or lower than corresponds to the momentary position of the discriminator. This direct voltage is, after amplification in an amplifier $V_1$, used for the control of a motor $M_1$ which readjusts the rotary capacitor until the voltages which are being compared have the same value. The difference voltage is then zero and the motor $M_1$ stops. A definite position of the rotary capacitor is thus obtained for each frequency supplied. The rotary capacitor is by means of a suitable shaft connected with a cam disk or a similar control member for effecting the coarse adjustment, if desired with the use of suitable auxiliary control devices, of the range of the tuning elements. A scale is driven from the same shaft, for indicating the frequency to which the transmitter had been tuned. As indicated in the illustrated example by dotted lines, the discriminator D jointly with the motor $M_1$ effects in the anode oscillation circuits of the preamplifier stage, drive stage and end stage, coarse tuning of the capacitors $C_1 \ldots C_8$ and variometers $L_1 \ldots L_6$, to the supplied control frequency. The coarse adjustment of the tuning elements may be effected with the use of a common shaft.

The accurate resonance tuning to the supplied control frequency is carried out with the aid of phase bridges. The need for the resonance tuning of oscillation circuits applies in the present example to the anode circuits of all three transmitter stages VS, TS and ES. The circuits are tuned separately, thus requiring three drive motors for the tuning of the three circuits. The tuning as such is effected according to the phase angle between the grid voltage and anode voltage of the respective transmitter stage. In the present case, so-called Riegger bridges are used as phase bridges, such bridges requiring a phase shifting of the values to be compared, by 90°. For this purpose, in all stages except the first stage, the anode alternating voltage is taken off by means of a capacitive tap H, the inductive oscillation circuit current of the grid circuit being taken off by means of an inductive tap J, and conducted to the bridge. The resonance tuning arrangement for the preamplifier stage VS comprises a phase bridge $Ph_1$, an amplifier $V_2$ connected therewith and an adjustment motor $M_2$ which effects the tuning of the anode oscillation circuit of the preamplifier stage at the variometer $L_1$. At the driver stage TS, the arrangement comprises the phase bridge $Ph_2$, the amplifier $V_3$ and the adjusting motor $M_3$ which controls the variometer $L_3$. At the end stage ES are correspondingly provided a phase bridge $Ph_3$, an amplifier $V_4$ and a motor $M_4$ which adjusts the variometer $L_5$.

The tuning of a filter circuit of the end stage is utilized for the coupling adjustment for the purpose of adjusting the power decoupling to the correct working impedance for the tube of the end stage. A device is for this purpose used at the output of the transmitter which delivers independently of the prevailing mismatching a direct voltage which is proportional to the root of the delivered transmitter power. This direct voltage is by means of a transducer W of suitable characteristic obtained at the output and compared with another direct voltage which is produced by rectification of a part of the anode alternating voltage, which part is taken off at the end stage by means of the tap K. A rectifier $G_1$ serves for the rectification and an amplitude comparison circuit $A_1$ for the amplitude comparison. This arrangement may be adjusted so that the difference voltage becomes at the desired output power and the desired anode alternating voltage, zero. If the ratio of the two voltages does not have the desired value, namely, so long as the coupling is not correctly adjusted, there will appear a difference voltage which is in a circuit over an amplifier $V_5$ used for the control of a motor $M_5$ which changes the filter circuit variometer until the difference voltage becomes zero, when the correct coupling is obtained.

The total amplification of the transmitter amplifier is, by adjustment provided for therefor, brought to a constant value such, that the desired output power is obtained for a constant input voltage, for example, of 2.5 $V_{eff}$. For this purpose is likewise used the already noted direct voltage which is proportional to the root of the transmitter power and taken off at the output of the transmitter with the aid of the transducer W. Upon comparing this voltage with a voltage taken off at the input E by means of the tap N and obtained from the input alternating voltage by rectification in the rectifier $G_2$, a difference voltage can be obtained in similar manner in an amplitude comparison $A_2$, which is amplified in an amplifier $V_6$ and conducted to an adjusting motor $M_6$ which serves for adjusting an amplifier regulator R. Letters U and O (right upper part of FIG. 1*b*) designate respectively a customary power- and matching meter and an harmonic wave filter.

The described adjustment operations are released by automatic program control with the aid of the program control device P*r* shown in FIG. 1*a*. When the transmitter is to be readjusted to a given frequency, a value of such frequency, which is held constant, is conducted to the transmitter. An output voltage is thereby produced at the discriminator D which causes the readjustment thereof, thus initiating the correct course of the adjustment operations of the various adjustment elements. A signal is given to the central control station which holds the value of the supplied frequency up to the conclusion of the tuning. A further signal from the program device is given over the line $S_1$ to the high voltage rectifier, such signal causing disconnection of all high voltages of the transmitter, an acknowledgment being given back over the line $S_2$. The adjustment of the ranges over the contact or cam disk or the like, controlled by the discriminator, is freed only after the disconnection of the high voltage which is reconnected again after the completion of the range adjustment. The phase bridges of the various stages and the amplitude comparison circuits for the adjustment of the coupling and the amplification of the voltage thereof, receive the required voltage upon reconnection of the high voltage.

In the event that the output voltage of the transmitter is very low or zero, which will practically always be the case so long as the transmitter is not correctly tuned, the amplitude comparison circuit $A_2$ will supply a high output voltage for the amplifier adjustment. This will cause energization of a relay B, provided at the program device P*r*, such relay opening its contact *b*, thereby switching in an attenuation member $D_1$ at the input of the transmitter, which automatically reduces or attenuates the control frequency voltage prior to the resonance tuning. The purpose of this measure is to prevent damage to components and tubes by excessively increased voltages.

The automatic resonance tuning of the oscillation circuits is effected successively in the preamplifier stage, the drive stage and the end stage. The tuning of the preamplifier stage VS is effected first. Upon concluding this tuning, so that the output voltage of the phase bridge $Ph_1$ or the associated amplifier $V_2$, is zero, there is effected the tuning of the driver stage TS. The feedback coupling in the transmitter, which extends from the output of the end stage ES to the input of the preamplifier stage VS, is automatically disconnected prior to the resonance tuning of the oscillation circuits. At the program device P*r* is for this purpose provided a relay F which operates its contact $f_1$ to shortcircuit the feedback circuit. The amplification is advantageously held constant upon disconnection of the feedback, for example, by equalizing the amplification increase by an equally great amplification drop. There is for this purpose provided a second contact $f_2$ which is controlled by the relay F so as to connect a suitable attenuation member $D_2$ at the transmitter input. The feedback is reconnected after all tuning circuits are correctly adjusted, by causing the relay F to release, such relay opening its contact $f_1$ and closing its contact $f_2$, the latter contact bridging the attenuation member $D_2$ and thereby removing the attenuation of the input voltage. The amplification adjustment is effected after reconnection of the feedback.

A conclusion signal is over the line $S_3$ given from the transmitter to the control station, after all adjustment operations are carried out, thereby signalling to the control station that the transmitter is ready for operation. The control station thereupon switches over to the desired mode of operation.

In the event that an alteration of the tuning occurs during the operation, for example, by an alteration at the antenna, the conclusion signal is not immediately resolved but only after a delay of 1 . . . 2 seconds. This delay is so selected that alterations in the adjustment can be automatically corrected. The operation is in no way disturbed so long as this correction takes place within the delay interval for the conclusion signal. However, if the time required for the correction of the tuning exceeds the delay interval of 1 . . . 2 seconds, the conclusion signal is not released but a trouble signal is instead given from the transmitter to the central control station. This trouble signal can be given in the presence of any kind of disturbance. The trouble signal is automatically released when the delay interval for the conclusion signal is exceeded. The conclusion signal and in given cases the trouble signal, are transmitted to the central station from the program control device P*r* over the line $S_3$. The signal for the connection and disconnection of the high voltage is given over the line $S_1$ and the corresponding acknowledgement signal is given over the line $S_2$.

The program control device delivers control signals for the individual operations in the following sequence:

(1) Connection of the control frequency;
(2) Disconnection of the high voltage;
(3) Release of the range adjustment;
(4) Reconnection of the high voltage;
(5) Disconnection of the feedback;
(6) Attenuation of the control frequency voltage;
(7) Resonance tuning successively in the preamplification and driver stages;
(8) Resonance tuning and coupling adjustment in the end stage;
(9) Reconnection of the feedback and removal of the attenuation of the control frequency voltage;
(10) Release of the amplification adjustment; and
(11) Transmission of the conclusion signal or, in case of trouble, after a delay, of the trouble signal.

Switching elements operating without contacts, such as transistors or the like, are employed for effecting the individual switching operations, so as to secure operating reliability as high as possible. It is likewise advantageous to construct the control circuits for the motors and the motors themselves completely without contacts. Rotary field motors for 400 cycles are for example suitable for this purpose.

Changes may be made within the scope and spirit of the appended claims which define what is believed to be new and desired to have protected by Letters Patent.

I claim:

1. A method for automatically adjusting a broadcast transmitted, with transmitter stages having tuned oscillation circuits, and including an end stage, to a control frequency supplied thereto from a central station or the like, which control frequency has a value maintained constant during the tuning adjustment, comprising the steps of adjusting tuning elements of the transmitter stages to a coarse range in dependence upon the frequency of said supplied control frequency, tuning the oscillation circuits in the transmitter stages, by resonance tuning, to the control frequency, adjusting the coupling of the end stage by impedance matching to its working impedance, adjusting the total amplification of the transmitter to the desired output power, and transmitting to the central station a signal for effecting holding of the supplied control frequency value to the conclusion of the tuning.

2. A method for automatically adjusting a broadcast transmitter with input, drive, and end stages, having tuning elements, to a control frequency supplied thereto from a central control station or the like comprising the steps of first effecting a coarse range adjustment of the tuning elements of the transmitter stages, disconnecting the high voltage of the transmitter prior to such coarse adjustment and reconnecting the same following completion thereof, then successively effecting a resonance tuning of the input, drive and end stages of the transmiter, disconnecting a feedback coupling between the transmitter output and input prior to such resonance tuning and reconnecting the same following completion thereof, reducing the transmitter amplification prior to such resonance tuning and restoring the same following completion thereof, and then effecting a coupling adjustment of the end stage and automatically adjusting the overall amplification to the desired output level.

3. A method as defined in claim 1, comprising the additional step of disconnecting the high voltage from the transmitter stages during coarse range adjustment.

4. A method as defined in claim 3 for adjusting a transmitter with feedback coupling between the end stage and the input stage comprising the additional step of disconnecting said feedback during the resonance tuning of the oscillation circuits thereof.

5. A method as defined in claim 1, for adjusting a transmitter with reamplifier, driver, and end stages in which the step of effecting resonance tuning of the oscillation circuits proceeds successively in the preamplifier stage, the driver stage and the end stage of the transmitter.

6. A method as defined in claim 4, comprising the additional step of attenuating the control frequency during resonance tuning.

7. A method as defined in claim 4, wherein the resonance tuning of the oscillation circuits in the output stage is effected simultaneously with the coupling adjustment thereof.

8. A method as defined in claim 4 in which, during the period that the feedback is disconnected, the amplification is held constant by introducing attenuation which compensates for the amplification increase by effecting a corresponding amplification decrease.

9. A method as defined in claim 1 comprising the additional step of transmitting to the central control station after completion of all adjusting operations a conclusion signal to signify the operative readiness of the transmitter.

10. A method as defined in claim 9, comprising the additional step of delaying said conclusion signal a predetermined time during which can be effected corrections in the adjustments.

11. A method as defined in claim 10 comprising the additional step of transmitting a trouble signal to the central control station effective upon exceeding the time delay interval.

12. A method as defined in claim 1 comprising the additional step of transmitting the transmitter to the central station a trouble signal effective upon disturbance in the adjusting operations.

References Cited by the Examiner

UNITED STATES PATENTS

| | | | |
|---|---|---|---|
| 2,376,667 | 5/1945 | Cunningham et al. | 325—174 |
| 2,505,511 | 4/1950 | Voegel | 325—175 |
| 2,824,220 | 2/1958 | Epperson | 325—186 |

DAVID G. REDINBAUGH, *Primary Examiner.*

J. W. CALDWELL, *Assistant Examiner.*